United States Patent
Poquet et al.

(10) Patent No.: US 6,530,575 B2
(45) Date of Patent: Mar. 11, 2003

(54) STATIC SEALING JOINT

(75) Inventors: Jean-Paul Poquet, Mont d'or (FR); Alexis Combet, Lyons (FR)

(73) Assignee: Federal Mogul Sealing Systems (FR)

( * ) Notice: Subject to any disclaimer, the term of this patent is extended or adjusted under 35 U.S.C. 154(b) by 0 days.

(21) Appl. No.: 09/486,835
(22) PCT Filed: Sep. 9, 1998
(86) PCT No.: PCT/FR98/01924
§ 371 (c)(1),
(2), (4) Date: May 22, 2000
(87) PCT Pub. No.: WO99/13248
PCT Pub. Date: Mar. 18, 1999

(65) Prior Publication Data
US 2002/0163139 A1 Nov. 7, 2002

(30) Foreign Application Priority Data
Sep. 9, 1997 (FR) .............................. 97 11420

(51) Int. Cl.[7] ............................... F02F 11/00
(52) U.S. Cl. ..................... 277/592; 277/594; 277/596
(58) Field of Search ................ 277/592–4, 596

(56) References Cited

U.S. PATENT DOCUMENTS

| | | | |
|---|---|---|---|
| 3,352,564 A | * | 11/1967 | Johnson |
| 3,794,333 A | * | 2/1974 | Czernik et al. |
| 3,837,657 A | | 9/1974 | Farnam et al. |
| 3,930,656 A | * | 1/1976 | Jelinek |
| 4,535,996 A | * | 8/1985 | Cardis et al. |
| 4,535,999 A | * | 8/1985 | Locacius |
| 4,625,979 A | | 12/1986 | Inciong |
| 4,721,315 A | * | 1/1988 | Ueta |
| 4,828,275 A | * | 5/1989 | Udagawa |
| 4,852,893 A | | 8/1989 | Wesley |
| 4,911,972 A | * | 3/1990 | Mercuri ..................... 428/99 |
| 4,955,621 A | * | 9/1990 | Skrycki |
| 5,110,630 A | * | 5/1992 | Abe et al. ................. 427/327 |
| 5,164,136 A | * | 11/1992 | Comert et al. ............. 264/232 |
| 5,267,740 A | | 12/1993 | Stritzke |
| 5,322,299 A | * | 6/1994 | Terai |
| 5,615,898 A | * | 4/1997 | Clark et al. |
| 5,681,048 A | * | 10/1997 | Tronel |
| 5,735,529 A | * | 4/1998 | Lawrence |
| 5,975,540 A | * | 11/1999 | Miyaoh ..................... 277/593 |

FOREIGN PATENT DOCUMENTS

| | | |
|---|---|---|
| DE | 4402399 | 1/1996 |
| EP | 0259794 | 3/1988 |
| EP | 0281228 A1 | 9/1988 |
| EP | 0505693 | 9/1992 |
| EP | 000702174 A1 * | 3/1996 |

* cited by examiner

Primary Examiner—Anthony Knight
Assistant Examiner—Alison K. Pickard
(74) Attorney, Agent, or Firm—Cantor Colburn LLP

(57) ABSTRACT

The invention concerns a joint comprising a flat metal core made of soft steel, coated on each of its surfaces with a layer of elastomer bound by constituents ensuring its adherence on the metal, the thickness of the elastomer varying on the joint surface, depending on the shape of the parts between which the joint is designed to be mounted and the sealing requirements at each point on the joint surface, the elastomer being cold deposited on each joint surface, then the whole assembly being placed in a heated mould, for forming the elastomer before vulcanisation.

17 Claims, 1 Drawing Sheet

STATIC SEALING JOINT

FIELD OF THE INVENTION

The subject of this invention is a static gasket designed to be used mainly in the automotive field and to make a tight seal between an immobile part and a cover, for example of an oil tank, a cylinder head, an oil pump or a water pump, or to make a tight seal on a distributor case, or to form an intake manifold seal.

DESCRIPTION OF THE RELATED ART

There are different types of static gaskets at this time.

A first gasket is made of pure elastomer. This gasket has the advantage of being cheap and having damping properties. However, this gasket has no mechanical stability before mounting, and the center distance between the axes of the holes the screws go through is not controlled, which complicates handling and mounting. This type of gasket also has no compression limits and does not ensure any fixed dimension between the elements being sealed, unless there are struts, which can translate into risks of bursting in the tightened position.

A second gasket is made from a silicone paste deposited directly on the container to be sealed. This type of gasket is used mainly for cylinder head covers. In this case, a bead of paste is deposited by a robot on an assembly line. The advantage of such a gasket is that it is cheap, its basic disadvantages being that it is destroyed when the cover with which it is associated is removed, and that it is difficult to redeposit a new gasket like it.

Another type of gasket is comprised of a cardboard support (fiber and elastomer) produced by paper manufacturing techniques. Such gaskets are used frequently to make seals on oil tanks and sometimes cylinder head covers. Such a gasket has the advantage of being cheap, but it makes a very mediocre seal.

Another type of gasket is the coated metal type. This is a band of metal material, such as stainless steel, approximately 0.2 to 0.4 mm thick, which has at least one continuous rib to provide the stress that makes the seal. To protect the steel, this metal band is coated with a layer of several microns of elastomer, such as a nitrile or a fluorine-type elastomer forming a surface-sealing layer.

Such a gasket has a reasonable cost price, has good sealing properties, but takes substantial resources to produce (induction line).

Document U.S. Pat. No. 4,625,979 concerns a cylinder head gasket having a core made of several laminated layers, for example a metal core coated on its two faces with two fibrous layers, fiberglass or asbestos-based, bonded by a polymer. The holes the fluids go through are surrounded by beads of silicone seal with a constant height, deposited by serigraphy and each bordered, on both sides, by a more rigid rib, designed to limit the flow of the silicone bead when tightened.

SUMMARY OF THE INVENTION

The goal of the invention is to provide a static gasket at a moderate cost price that is easy to use and suitable for many applications.

For this purpose, the gasket that it concerns, has a flat metal core made of soft steel, coated on each side with an elastomer layer bonded with components that allow it to adhere to the metal, with the thickness of the elastomer varying on the surface of the gasket, depending on the shape of the pieces between which the gasket is intended to be mounted and the sealing requirements at each point on the surface of the gasket; the elastomer is deposited cold on each side of the gasket, then the whole thing is placed in a heated mold, designed to mold the elastomer and then vulcanize it.

One feature of the invention is that the soft steel of which the core is composed is galvanized steel, and the thickness of the core is around 0.2 mm. The elastomer can be in the silicone family.

The invention thus provides a gasket in which the sealing parts made of elastomer are made of a single material and obtained in a single operation, during the manufacture of the gasket, with modulation of the thickness to guarantee a contact pressure adapted to the potential deformation of the pieces being sealed. Considering the presence of the adhering compounds, the resistance of the elastomer to the lateral flux under stress is excellent, and the whole thing can resist pressures of 80 MPs.

Another feature is that the thickness of the elastomer can vary from 0 to 0.3 mm per face.

In addition, each layer of elastomer contains, at least locally, a thread or rib extending in the direction of the length of the gasket. Each thread has a section with a general triangular shape, and the height of the threads can vary depending on the seal being made, based on the tightening characteristics. The height of the threads can be around 0.06 to 0.5 mm. The thread can be either not present at certain places on the gasket, or it is possible to have several parallel threads in other places to create several sealing barriers.

In one embodiment, each layer of elastomer has, at least locally, crossed threads forming a network that partitions off the seal.

Another feature of the invention is that at least one layer of elastomer has localized excessive thickness near at least one of its edges to make a lateral seal when tightened.

Another possibility is that the metal core has clefts forming tightening stops that improve the connection of the elastomer layers.

In any case, the invention will be better understood from the following description, which refers to the attached schematic drawing showing one form of embodiment of this gasket as a non-limiting example.

DETAILED DESCRIPTION OF THE PREFERRED EMBODIMENT

Figure 1:
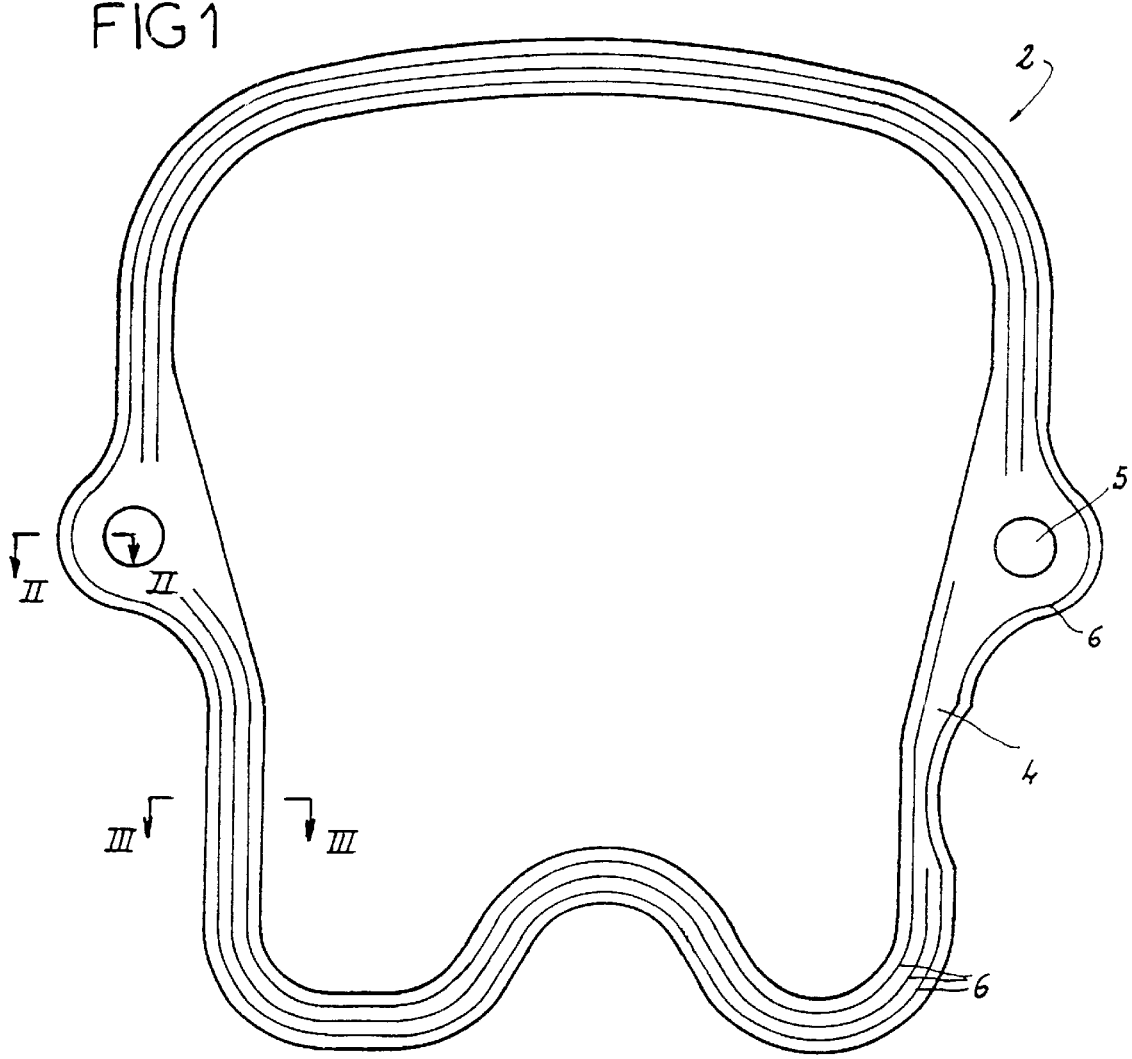
FIG. 1 is a top view of a cylinder head cover gasket.
Figure 2:
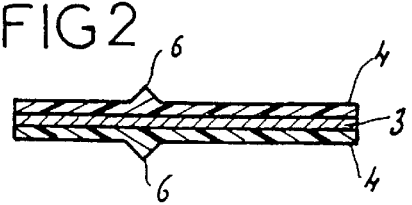
FIGS. 2 and 3 are two cross sectional views on an enlarged scale along lines II—II and III—III in FIG. 1.
Figure 3:
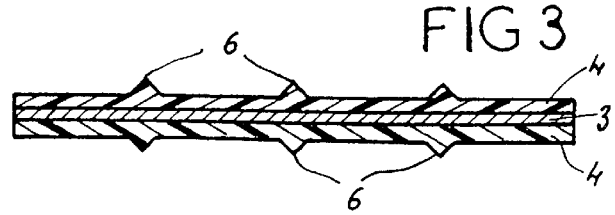
Figure 4:
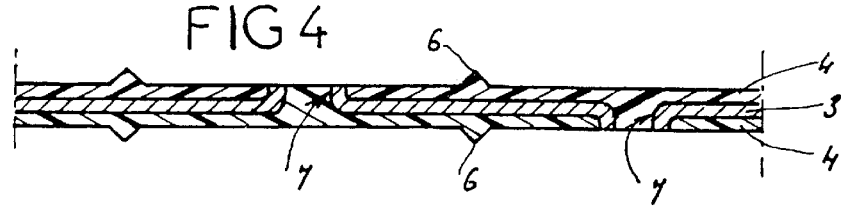
FIG. 4 is a cross sectional view on an enlarged scale of another gasket.

Gasket 2 shown in the drawing is a cylinder-head cover gasket for a thermal engine. This gasket has a core 3 comprised of a flat metal band made of galvanized steel. On two sides, this band is covered with two layers of an elastomer 4, such as silicone.

The thickness of the core is around 0.2 mm. The thickness of each elastomer layer varies from around 0 to 0.3 mm. The gasket shown in the drawing has two holes 5 for the tightening screws to go through. The thickness of the two layers 4 of elastomer varies on the periphery of the gasket, being minimal in the tightening zones, that is the near the holes 5, and being maximal in the end zones, that is, the zones offset 90° in relation to the holes 5.

Thus, near the holes 5, the thickness of the gasket is scarcely greater than the thickness of the metal band 3, while in the thicker zones offset 90°, it can be around 0.35 to 0.40 mm, considering the greater thickness of the elastomer layers 4.

Figure 6:
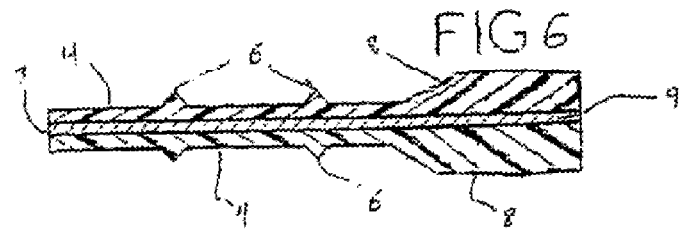

In another embodiment of the invention, as shown in FIG. 6, the elastomer layers 4 have localized excess thicknesses 8 near an edge 9 of the gasket.

Another feature of the invention is that each polymer layer 4 has longitudinal threads 6, with a general triangular section, and a height that can vary from around 0.1 to 0.5 mm. These threads 6 are located taking into account the stresses exerted on the gasket to provide an optimal seal. Thus, in the attachment hole zones 5, there is only one thread, while on the rest of the length of the gasket, there are three parallel threads that make up three sealing barriers.

It is also possible to make the height of the threads 6 vary to take the sealing requirements into account locally.

The two layers 4 of elastomer are deposited on the core 3, an operation during which they are attached to that core using adhering compounds. The whole thing is then placed in a heated mold in which the two layers of elastomer are first molded and then vulcanized. It is also possible to improve this attachment with mechanical hooks, using clefts 7 made in the core 3, on either side of it; these clefts are used for tightening stops and for mechanical attachment of the polymer layers.

Figure 5:
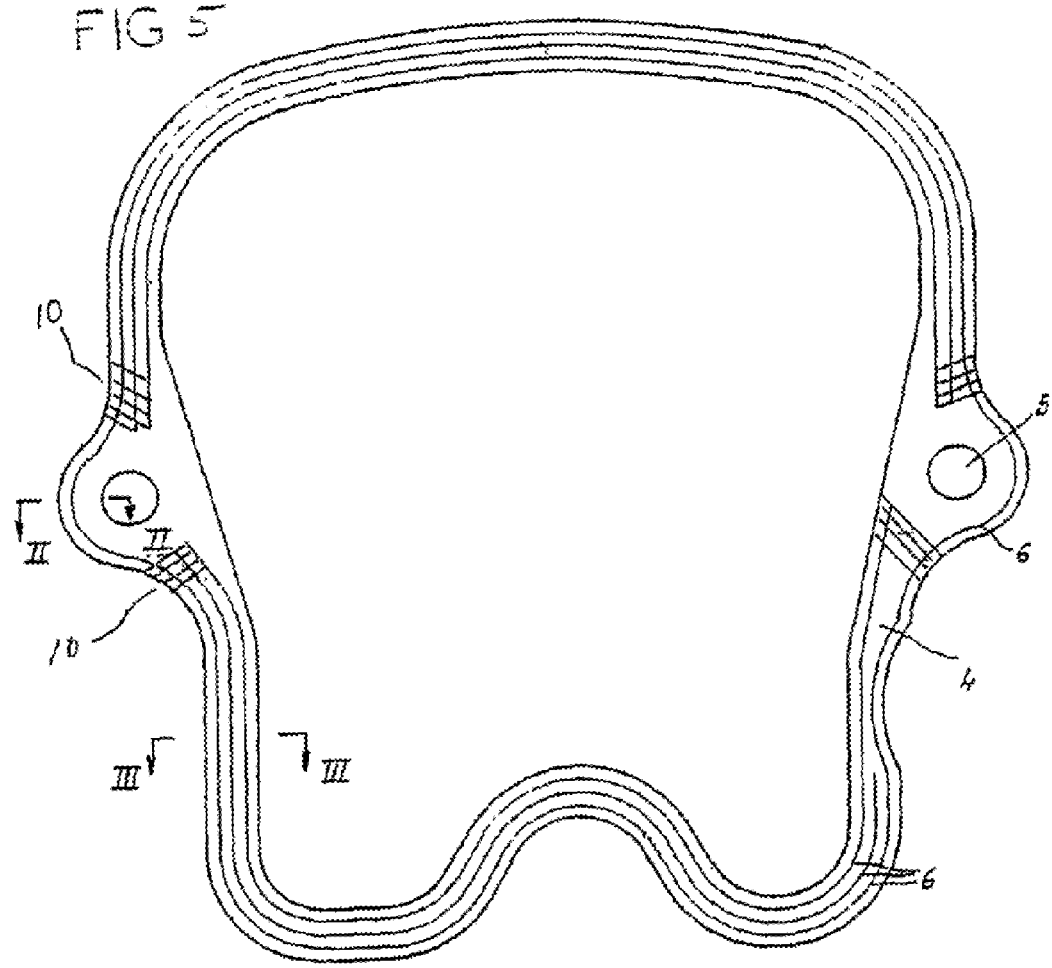

In another embodiment of the invention, as shown in FIG. 5, each layer of elastomer 4 has, at least locally, crossed threads 6 forming a network 10 that partitions off the seal.

As can be seen from the preceding, the invention makes a great improvement in the existing technique, by providing a simple structural seal obtained in a single operation, having a core made of an inexpensive material providing the seal with good mechanical strength, and two layers of elastomer located on either side of the core which, for their part, perform the sealing function, with the possibility of modulating the thicknesses of these layers to take into account stresses associated with the environment of the seal.

Obviously, the invention is not limited to only the form of embodiment of this joint described above by way of example; on the contrary, it embraces all the variations. Thus, in particular, this seal could not have threads, the threads could be inclined and form a network with a variable cross section and height, providing locally a partitioning of the seal, or the polymer layers could have at least some localized excess thickness near at least one of their edges, without going beyond the framework of the invention.

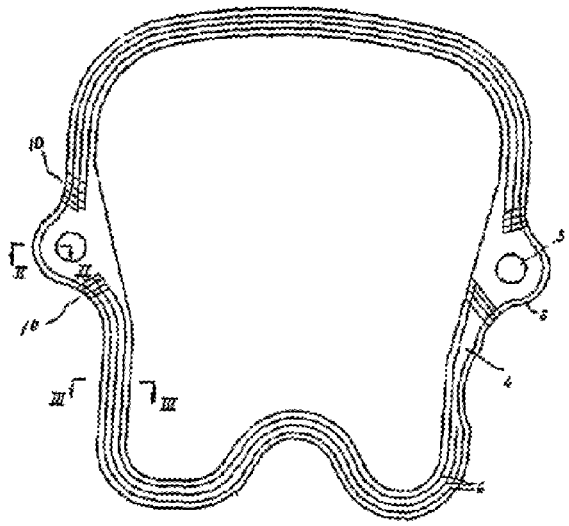

What is claimed is:

1. A static gasket, comprising:
   a flat and continuous metal core made of steel including a top surface and a bottom surface; and
   a single sealing layer of elastomer bonded to at least the top and bottom surfaces of the metal core, the thickness of the sealing layer of elastomer varying on the top and bottom surfaces of the metal core, depending on the shape of pieces between which the gasket is intended to be mounted and sealing requirements at each point on the surface of the gasket, the sealing layer of elastomer further including at least one thread or rib extending in a direction of the length of the gasket.

2. The gasket in claim 1 wherein the steel is galvanized steel.

3. The gasket in claim 1 wherein the thickness of the core is around 0.2 mm.

4. The gasket in claim 1 wherein the thickness of the sealing layer of elastomer is between around 0 and 0.3 mm per side.

5. The gasket in claim 1 wherein the sealing layer of elastomer comprises, at least locally, crossed threads forming a network that partitions the gasket.

6. The gasket in claim 5 wherein each thread has a section with a general triangular shape.

7. The gasket in claim 5 wherein each thread has a height on the order of 0.05 to 0.5 mm.

8. The gasket in claim 1 wherein at least one elastomer layer has at least one localized excess thickness near at least one of its edges in order to make a lateral seal when tightened.

9. The gasket in claim 1, further comprising holes formed therein for receiving means for attachment and for allowing passage of the means for attachment through the gasket.

10. The gasket in claim 9 wherein the holes include a first hole formed in a first side of the gasket and a second hole formed in a second side of the gasket wherein the first and second sides are located opposite one another.

11. The gasket in claim 9 wherein the thickness of the sealing layer is minimal proximate the holes and maximal at an end zone away from the holes.

12. The gasket in claim 11 wherein the minimal thickness is 0 and the maximal thickness is 0.4 mm.

13. The gasket in claim 9 wherein the at least one thread or rib includes a first thread or rib proximate the holes extending in a direction of the length of the gasket.

14. The gasket in claim 13 wherein the sealing layer further includes a second, third, and fourth thread or rib extending parallel to one another in the direction of the length of the gasket to form three sealing barriers.

15. A method of manufacturing a static gasket including a flat and continuous metal core made of steel including a top surface and a bottom surface; and a single sealing layer of elastomer bonded to the top and bottom surfaces of the metal core, the thickness of the sealing layer of elastomer varying on the top and bottom surfaces of the metal core according to a shape of pieces between which the gasket is mounted and according to sealing requirements at each point on a surface of the gasket, the sealing layer of elastomer further including a rib extending in a direction of the length of the gasket, the method comprising:
   bonding the layer of elastomer on the top and bottom surfaces of the flat and continuous metal core layer,
   placing the metal core having the layer of elastomer bonded thereon in a mold;
   molding the layer of elastomer in the mold to have a thickness varying on the metal core layer; and
   vulcanizing the layer of elastomer.

16. The method of claim 15 wherein said molding includes forming the rib extending in a direction of the length of the gasket.

17. A static gasket, comprising:
   a flat and continuous metal core made of steel including a top surface and a bottom surface; and
   a single sealing layer of elastomer bonded to the top and bottom surfaces of the metal core the thickness of the sealing layer of elastomer varying on the top and bottom surfaces of the metal core according to a shape of pieces between which the gasket is mounted and according to sealing requirements at each point on a surface of the gasket, the sealing layer of elastomer further including a rib extending in a direction of the length of the gasket.

* * * * *

UNITED STATES PATENT AND TRADEMARK OFFICE
CERTIFICATE OF CORRECTION

| | | |
|---|---|---|
| PATENT NO. | : 6,530,575 B2 | |
| APPLICATION NO. | : 09/486835 | |
| DATED | : March 11, 2003 | |
| INVENTOR(S) | : Jean Paul Poquet et al. | |

It is certified that error appears in the above-identified patent and that said Letters Patent is hereby corrected as shown below:

The title page should be deleted to appear as per attached title page.

Title Page:
Item (75), Inventors, after "Alexis Combet,", delete "Lyons" and insert therefor --Lyon--;
After "17 Claims,", delete "1 Drawing Sheet" and insert therefor --2 Drawing Sheets--;

The sheet of drawings consisting of figures 5 and 6 should be deleted to appear as per attached figures 5 and 6.

Column 2:
Line 47, after "gasket.", insert --Figure 5 is a top view of a cylinder head cover gasket in another embodiment of the invention; and Figure 6 is a cross-sectional view of a cylinder head cover gasket in still another embodiment of the invention--.

Signed and Sealed this

Twenty-fourth Day of July, 2007

JON W. DUDAS
*Director of the United States Patent and Trademark Office*

United States Patent
Poquet et al.

(10) Patent No.: US 6,530,575 B2
(45) Date of Patent: Mar. 11, 2003

(54) STATIC SEALING JOINT

(75) Inventors: Jean-Paul Poquet, Mont d'or (FR); Alexis Combet, Lyons (FR)

(73) Assignee: Federal Mogul Sealing Systems (FR)

(*) Notice: Subject to any disclaimer, the term of this patent is extended or adjusted under 35 U.S.C. 154(b) by 0 days.

(21) Appl. No.: 09/486,835
(22) PCT Filed: Sep. 9, 1998
(86) PCT No.: PCT/FR98/01924
§ 371 (c)(1),
(2), (4) Date: May 22, 2000
(87) PCT Pub. No.: WO99/13248
PCT Pub. Date: Mar. 18, 1999

(65) Prior Publication Data
US 2002/0163139 A1 Nov. 7, 2002

(30) Foreign Application Priority Data
Sep. 9, 1997 (FR) .................................. 97 11420

(51) Int. Cl.$^7$ .................................................. F02F 11/00
(52) U.S. Cl. ............................... 277/592; 277/594; 277/596
(58) Field of Search ............................ 277/592–4, 596

(56) References Cited

U.S. PATENT DOCUMENTS

| | | | |
|---|---|---|---|
| 3,352,564 A | * | 11/1967 | Johnson |
| 3,794,333 A | | 2/1974 | Czernik et al. |
| 3,837,657 A | | 9/1974 | Farnam et al. |
| 3,930,656 A | * | 1/1976 | Jelinek |
| 4,535,996 A | * | 8/1985 | Cardis et al. |
| 4,535,999 A | * | 8/1985 | Locacius |
| 4,625,979 A | | 12/1986 | Inciong |
| 4,721,315 A | * | 1/1988 | Ueta |
| 4,828,275 A | * | 5/1989 | Udagawa |
| 4,852,893 A | | 8/1989 | Wesley |
| 4,911,972 A | * | 3/1990 | Mercuri ........................ 428/99 |
| 4,955,621 A | * | 9/1990 | Skrycki |
| 5,110,630 A | * | 5/1992 | Abe et al. ....................... 427/327 |
| 5,164,136 A | * | 11/1992 | Comett et al. .................. 264/232 |
| 5,267,740 A | | 12/1993 | Stritzke |
| 5,322,299 A | * | 6/1994 | Terai |
| 5,615,898 A | | 4/1997 | Clark et al. |
| 5,681,048 A | * | 10/1997 | Tronel |
| 5,735,529 A | * | 4/1998 | Lawrence |
| 5,975,540 A | * | 11/1999 | Miyaoh ......................... 277/593 |

FOREIGN PATENT DOCUMENTS

| | | |
|---|---|---|
| DE | 4402399 | 1/1996 |
| EP | 0259794 | 3/1988 |
| EP | 0281228 A1 | 9/1988 |
| EP | 0503693 | 9/1992 |
| EP | 000702174 A1 * | 3/1996 |

* cited by examiner

Primary Examiner—Anthony Knight
Assistant Examiner—Alison K. Pickard
(74) Attorney, Agent, or Firm—Cantor Colburn LLP

(57) ABSTRACT

The invention concerns a joint comprising a flat metal core made of soft steel, coated on each of its surfaces with a layer of elastomer bound by constituents ensuring its adherence on the metal, the thickness of the elastomer varying on the joint surface, depending on the shape of the parts between which the joint is designed to be mounted and the sealing requirements at each point on the joint surface, the elastomer being cold deposited on each joint surface, then the whole assembly being placed in a heated mould, for forming the elastomer before vulcanisation.

17 Claims, 1 Drawing Sheet